US012689639B2

(12) United States Patent
Tian et al.

(10) Patent No.: US 12,689,639 B2
(45) Date of Patent: Jul. 21, 2026

(54) DETECTING ANOMALOUS NETWORK BEHAVIOR IN OPERATIONAL TECHNOLOGY PROTOCOLS

(71) Applicant: Palo Alto Networks, Inc., Santa Clara, CA (US)

(72) Inventors: Ke Tian, San Jose, CA (US); Aveek Kumar Das, Union City, CA (US); Derick Liang, Sunnyvale, CA (US); Rahul Rajewar, Santa Clara, CA (US); Gong Cheng, Sunnyvale, CA (US); Mei Wang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 113 days.

(21) Appl. No.: 18/224,298

(22) Filed: Jul. 20, 2023

(65) Prior Publication Data

US 2025/0030709 A1 Jan. 23, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ............. H04L 63/1425; H04L 63/1416; H04L 63/1441; H04L 63/166; H04L 63/168; H04L 63/02
USPC ........................................................ 726/23
See application file for complete search history.

(56) References Cited

U.S. PATENT DOCUMENTS

| | | | | |
|---|---|---|---|---|
| 12,088,600 | B1* | 9/2024 | Beauchesne | G06N 5/01 |
| 2020/0285737 | A1* | 9/2020 | Kraus | G06F 21/552 |
| 2021/0406720 | A1* | 12/2021 | Song | H04L 63/0227 |
| 2022/0191227 | A1* | 6/2022 | Pfleger de Aguiar | |
| | | | | H04L 63/1408 |
| 2023/0291755 | A1* | 9/2023 | Siebel | G06N 3/08 |
| 2023/0297672 | A1* | 9/2023 | Watson | G06F 21/554 |
| | | | | 726/23 |
| 2023/0367306 | A1* | 11/2023 | Chang | G06N 3/0455 |
| 2024/0361757 | A1* | 10/2024 | Luo | G05B 19/41865 |

FOREIGN PATENT DOCUMENTS

| | | |
|---|---|---|
| EP | 4120110 | 1/2023 |

OTHER PUBLICATIONS

Raveling et al. "Quantifying the Effects of Operational Technology or Industrial Control System based Cybersecurity Controls via CVSS Scoring." European Journal of Electrical Engineering and Computer Science 7.4 (2023): 1-6.
Sonkor et al. "Operational technology on construction sites: A review from the cybersecurity perspective." Journal of Construction Engineering and Management 147.12 (2021): 04021172.

* cited by examiner

*Primary Examiner* — Badrinarayanan
(74) *Attorney, Agent, or Firm* — Van Pelt, Yi & James LLP

(57) ABSTRACT

Techniques for detecting anomalous network behavior in operational technology (OT) protocols are disclosed. A system, process, and/or computer program product for detecting anomalous network behavior in OT protocols include monitoring network traffic to perform automated OT malware detection analysis of OT related network traffic, extracting one or more features from the OT related network traffic, inputting the one or more extracted features into a model for malware detection analysis, and performing an action based on a result of the model.

14 Claims, 11 Drawing Sheets

402

Evt_operation (New event type)  700

| | | | |
|---|---|---|---|
| t | evtContent.appName | ⊕ ⊖ ⊡ ✳ | modbus |
| t | evtContent.command | ⊕ ⊖ ⊡ ✳ | modbus-read-coils |
| # | evtContent.command_value.coilQuantity.int | ⊕ ⊖ ⊡ ✳ | 1 |
| # | evtContent.command_value.funcCode.int | ⊕ ⊖ ⊡ ✳ | 1 |
| # | evtContent.command_value.startAddress.int | ⊕ ⊖ ⊡ ✳ | 137 |
| t | evtContent.debugErrorMsg | ⊕ ⊖ ⊡ ✳ | no result found for tenant |
| t | evtContent.localIPAddr | ⊕ ⊖ ⊡ ✳ | 192.168.132.57 |
| # | evtContent.localPort | ⊕ ⊖ ⊡ ✳ | 49,710 |
| t | evtContent.localProfile | ⊕ ⊖ ⊡ ✳ | PC-Windows |
| t | evtContent.localProfileCategory | ⊕ ⊖ ⊡ ✳ | Personal Computer |
| t | evtContent.localProfileType | ⊕ ⊖ ⊡ ✳ | Non-IoT |
| t | evtContent.localProfileVeritical | ⊕ ⊖ ⊡ ✳ | Traditional IT |
| t | evtContent.remoteDevId | ⊕ ⊖ ⊡ ✳ | 172.24.11.211 |
| t | evtContent.remoteIPAddr | ⊕ ⊖ ⊡ ✳ | 172.24.11.211 |
| # | evtContent.remotePort | ⊕ ⊖ ⊡ ✳ | 502 |
| t | evtContent.remoteProfile | ⊕ ⊖ ⊡ ✳ | PC-Windows |
| t | evtContent.remoteProfileCategory | ⊕ ⊖ ⊡ ✳ | Personal Computer |
| t | evtContent.remoteProfileType | ⊕ ⊖ ⊡ ✳ | Non_IoT |
| t | evtContent.remoteProfileVeritical | ⊕ ⊖ ⊡ ✳ | Traditional IT |
| ⊙ | evtContent.session_start_time | ⊕ ⊖ ⊡ ✳ | July 20th 2022, 07:38:59.00 |
| # | evtContent.sessionid | ⊕ ⊖ ⊡ ✳ | 5,459,275 |
| ⊙ | evtContent.time_generated | ⊕ ⊖ ⊡ ✳ | July 20th 2022, 09:39:32.65 |
| t | evtLevel | ⊕ ⊖ ⊡ ✳ | EV_EVENT |
| t | evtSource | ⊕ ⊖ ⊡ ✳ | FirewallLog |
| t | evtType | ⊕ ⊖ ⊡ ✳ | evt_operation |
| t | evtContent.appName | ⊕ ⊖ ⊡ ✳ | modbus |
| t | evtContent.command | ⊕ ⊖ ⊡ ✳ | modbus-read-holding-registers |
| # | evtContent.command_value.exception.int | ⊕ ⊖ ⊡ ✳ | 2 |
| # | evtContent.command_value.funcCode.int | ⊕ ⊖ ⊡ ✳ | 3 |
| # | evtContent.command_value.registersQuantity.int | ⊕ ⊖ ⊡ ✳ | 114 |
| # | evtContent.command_value.startAddress.int | ⊕ ⊖ ⊡ ✳ | 20,628 |
| t | evtContent.localIPAddr | ⊕ ⊖ ⊡ ✳ | 10.20.6.5 |
| # | evtContent.localPort | ⊕ ⊖ ⊡ ✳ | 64,630 |
| t | evtContent.localProfile | ⊕ ⊖ ⊡ ✳ | PC-Windows |

FIG. 7

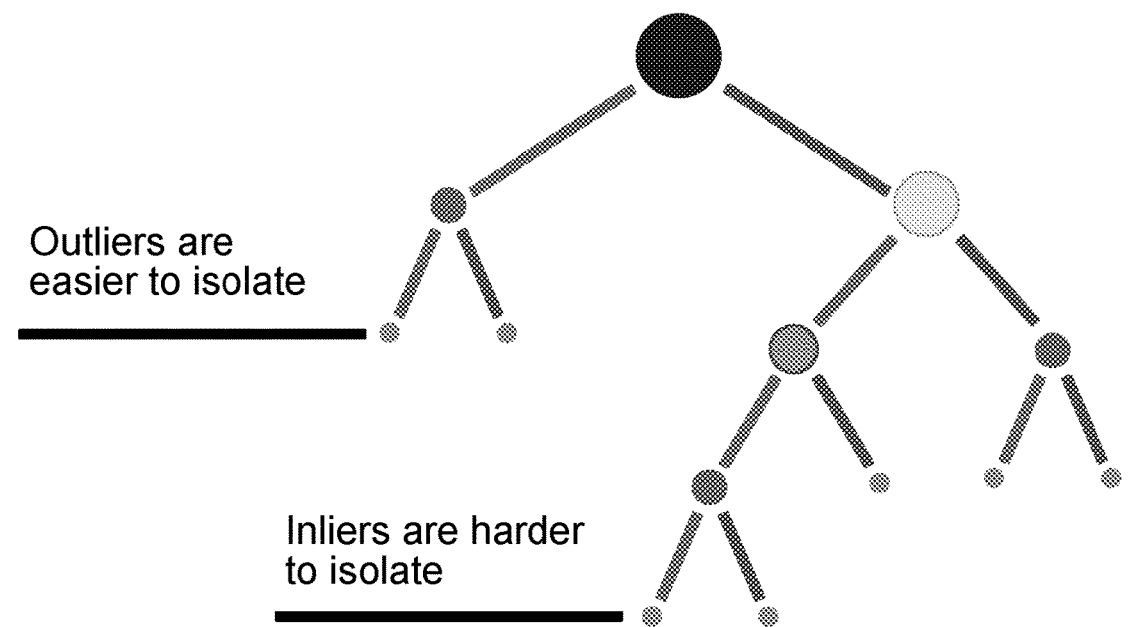
Outliers are
easier to isolate
Inliers are harder
to isolate
FIG. 8

900

910

920

930

940

1000 ⟍

MONITOR NETWORK TRAFFIC TO PERFORM AUTOMATED OPERATIONAL TECHNOLOGY (OT) MALWARE DETECTION ANALYSIS OF OT RELATED NETWORK TRAFFIC — 1010

EXTRACT ONE OR MORE FEATURES FROM OT RELATED NETWORK TRAFFIC — 1020

INPUT ONE OR MORE EXTRACTED FEATURES INTO MODEL FOR MALWARE DETECTION ANALYSIS — 1030

PERFORM ACTION — 1040

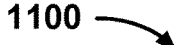
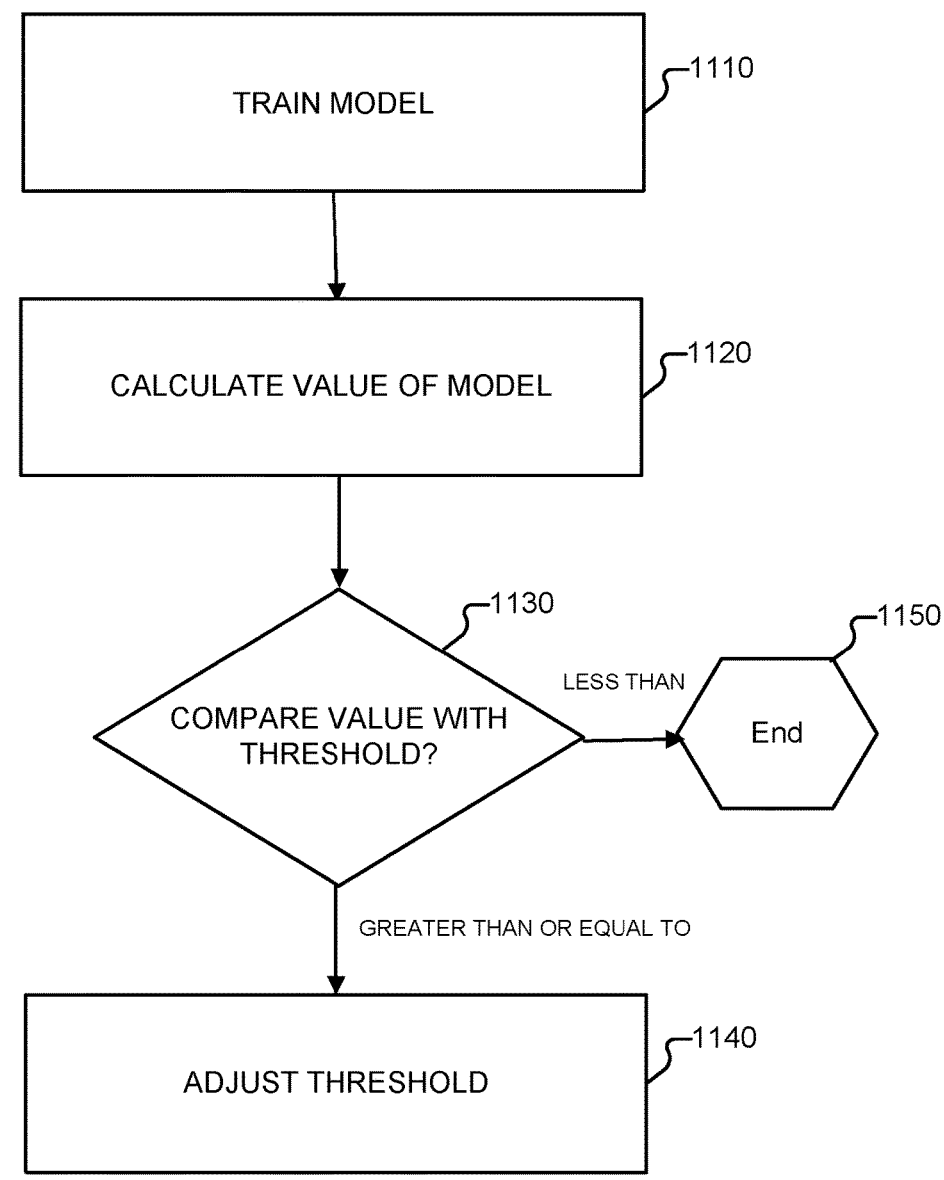
FIG. 11

DETECTING ANOMALOUS NETWORK BEHAVIOR IN OPERATIONAL TECHNOLOGY PROTOCOLS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

As use of industrial operational technology (OT) systems across many industries for mission-critical applications, like manufacturing, healthcare, etc., increase, an increase in the number of hacks and attacks also occurs.

BRIEF DESCRIPTION OF THE DRAWINGS

Various embodiments of the invention are disclosed in the following detailed description and the accompanying drawings.

FIG. 7 illustrates an example of an event log.

FIG. 8 illustrates an example of an isolation forest.

FIG. 11 is a flow diagram illustrating a process for training a model in accordance with some embodiments.

DETAILED DESCRIPTION

Figure 1:
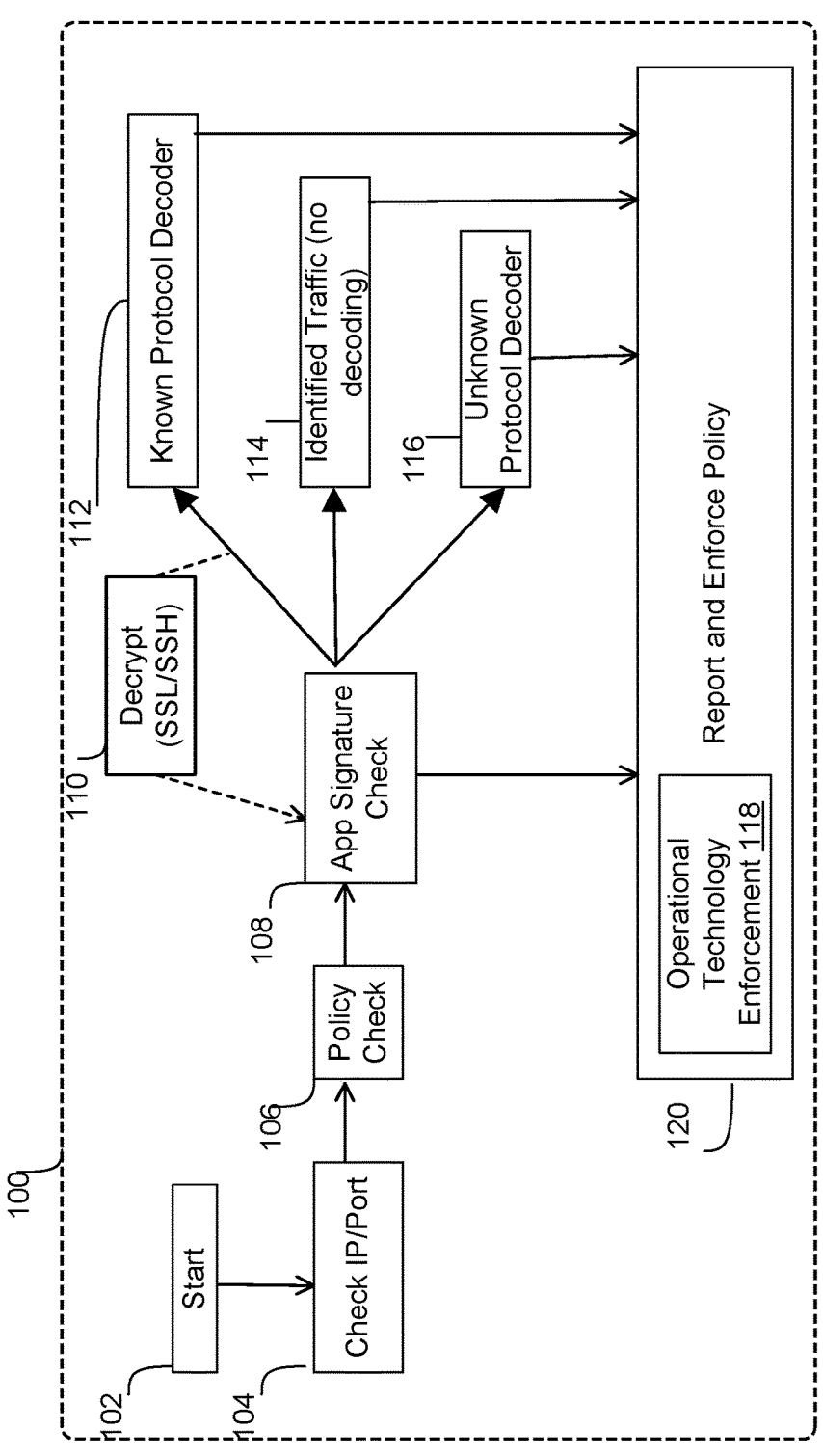
FIG. 1 is a functional diagram of an architecture of a security device that can be used for detecting anomalous network behavior in operational technology protocols in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some of the benefits of the present invention include being more scalable and having a higher detection rate than conventional techniques for detecting anomalous network behavior for OT protocol. Also, the model can be executed automatically without human supervision, so the data used does not need to be labeled (for example, labels include this is malware, this is not malware, or this may be potential malware). In other words, the data is analyzed and abnormal behaviors can be identified where abnormal behavior relates to a type of behavior that is outside the normal range. Also, the model of the present application can capture zero-day malware without involving a human expert or security expert.

In some embodiments, a system/method/computer program product for detecting anomalous network behavior in operational technology protocols includes monitoring network traffic to perform automated operational technology (OT) malware detection analysis of OT related network traffic, extracting one or more features from the OT related network traffic, inputting the one or more extracted features into a model for malware detection analysis, and performing an action based on a result of the model.

In some embodiments, the monitoring of the network traffic includes filtering TCP related traffic and/or UDP related traffic from the network traffic to obtain the OT related network traffic.

In some embodiments, the model includes a machine learning model.

In some embodiments, the machine learning model is implemented using an isolation forest for anomaly detection.

In some embodiments, the performing of the action includes performing one or more of the following: blocking the network traffic, sending an alert to an administrator, and/or generating a new signature relating to one or more OT related network events relating to a detected malware.

In some embodiments, the one or more extracted features include one or more of the following: static behaviors, static protocols, dynamic behaviors, and/or dynamic protocols.

In some embodiments, the model is updated using labeled training data.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, as OT systems across many industries for mission-critical applications, like manufacturing, healthcare, etc., increase, advanced or next generation firewalls need to also analyze OT protocols to protect the increasing OT systems from malware.

Thus, what are needed are techniques for detecting anomalous network behavior in OT protocols. Accordingly, techniques for detecting anomalous network behavior in OT protocols are disclosed.

FIG. 1 is a functional diagram of an architecture of a security device that can be used for detecting anomalous network behavior in operational technology protocols in accordance with some embodiments. As shown in FIG. 1, network traffic is monitored at a firewall 100. In some embodiments, network traffic is monitored using a data appliance (e.g., a data appliance that includes security functions, such as a security device/appliance that includes a firewall). In some embodiments, network traffic is monitored using a gateway (e.g., a gateway that includes security functions, such as a security gateway). In some embodiments, the network traffic is monitored using pass through (e.g., in line) monitoring techniques.

In some embodiments, network traffic is monitored using a state-based firewall. In some embodiments, the state-based firewall can monitor traffic flows using an APP-ID engine (e.g., App Signature Check & User ID Check 108). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., applying trusted man-in-the-middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combi-nations with other information, such as application, user, and/or other information, to enforce various security/firewall policies/rules.

In some embodiments, firewall 100 also includes an operational technology enforcement engine 118 for detect-ing anomalous network behavior.

Figure 2:
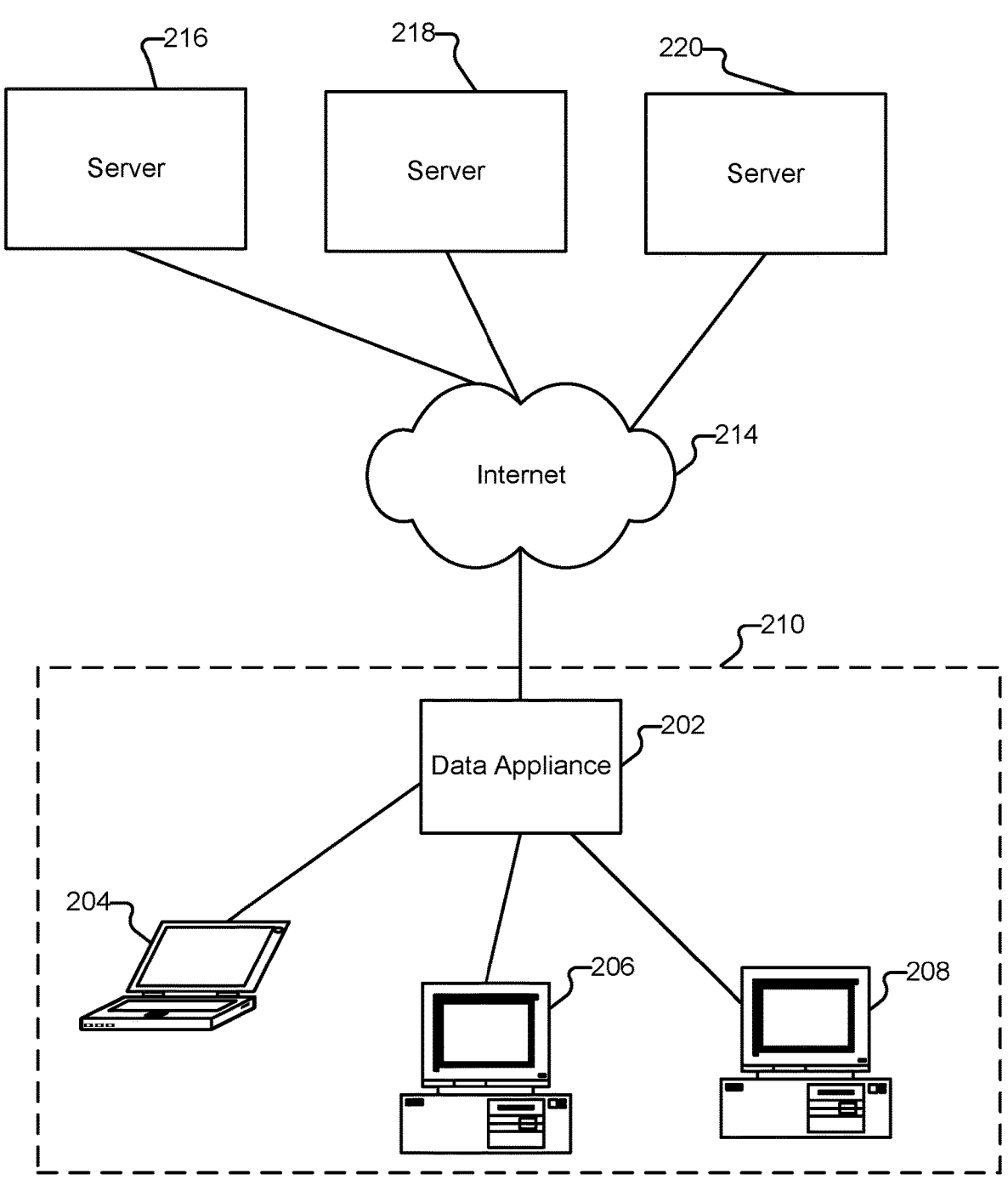
FIG. 2 is a block diagram of a network architecture that can be used for detecting anomalous network behavior in operational technology protocols in accordance with some embodiments.

FIG. 2 is a block diagram of a network architecture that can be used for detecting anomalous network behavior in operational technology protocols in accordance with some embodiments. As shown, a data appliance 202 (e.g., a data appliance that includes security functions, such as a security appliance/device that includes a firewall, a gateway that includes security functions, such as a security gateway, and/or any other device that includes a firewall function as described herein) is at the perimeter of a protected network 210, which includes clients 204, 206, and 208. Data appli-ance 202 includes a firewall function, such as firewall function 100 as described above, to protect the network and clients within the protected network 210, which is in com-munication with the Internet 214 and various servers, such as servers 216, 218, and 220 (e.g., web servers, mail servers, file servers, and/or other types of servers).

Figure 3A:
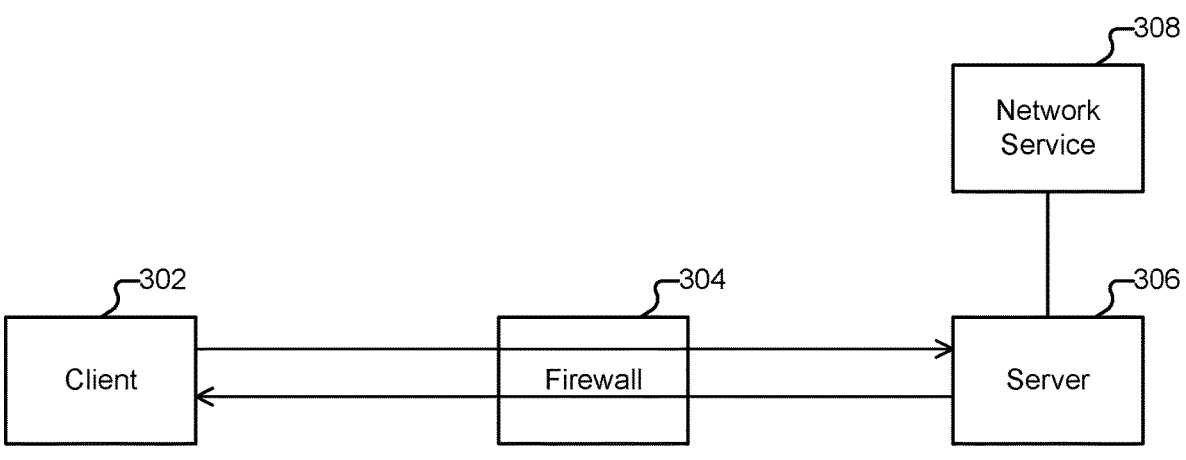
FIG. 3A is a functional block diagram illustrating a typical SSL session passing through a firewall.

FIG. 3A is a functional block diagram illustrating a typical SSL session passing through a firewall. In that session, the firewall can only inspect the handshake traffic, as all the application data is encrypted. As shown, a client 302 estab-lishes a secure tunnel session (e.g., creates an SSL tunnel) with a remote server 306. The client 302 can use the secure tunnel with the server 306 to access a network service 308, which can be a network service activity that is in violation of one or more firewall policies/rules implemented by the firewall device 304 (e.g., a policy that includes password complexity requirements for external site authentication). However, because the secure tunnel session traffic is encrypted and passes through a firewall 304, the firewall 304 cannot decrypt the encrypted secure tunnel session traffic and, thus, cannot detect such firewall policy/rule violation(s).

Accordingly, various techniques for intercepting and decoding encrypted tunneling communications from a client to a remote server are disclosed herein. For example, a trusted man-in-the-middle technique that can be used for intercepting and decoding encrypted tunneling communica-tions to monitor such traffic in the clear is described below with respect to FIG. 3B.

Figure 3B:
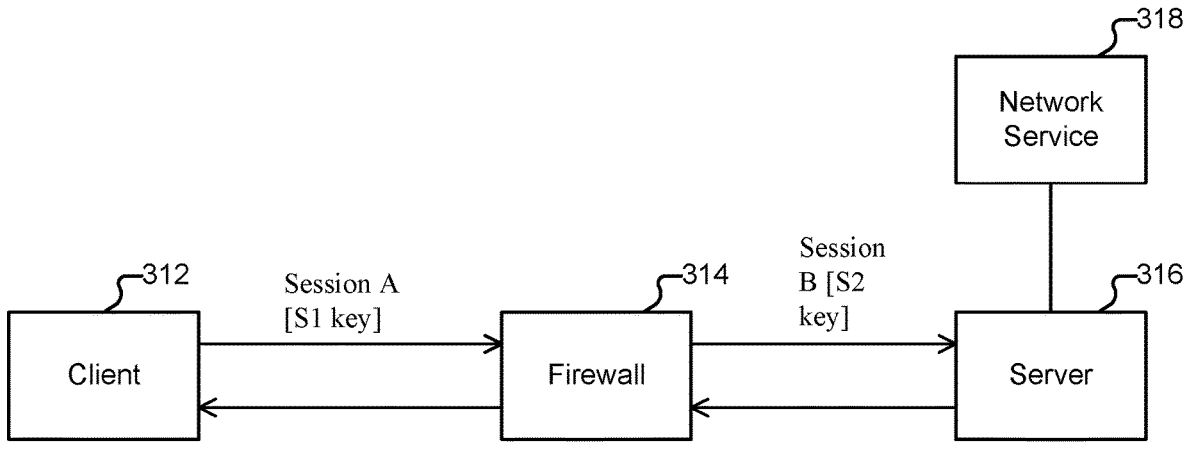
FIG. 3B is a functional block diagram illustrating the use of a firewall for detecting anomalous network behavior in operational technology protocols in accordance with some embodiments.

FIG. 3B is a functional block diagram illustrating the use of a firewall for detecting anomalous network behavior in operational technology protocols in accordance with some embodiments. As shown, a client 312 attempts to establish an SSL session with a remote server 316. The client 312 can attempt to use, for example, a secure tunnel with the server 316 to access a network service 318, which can be a network service activity that is in violation of one or more firewall policies/rules implemented by a firewall device 314. How-ever, in this case, the SSL session request is intercepted and detected by the firewall 314. In response, the firewall 314 performs a trusted man-in-the-middle technique by effec-tively splitting the SSL session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312.

Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key S1 and is then inspected by the firewall 314. If the client 312 requests a new channel to perform tunneling (e.g., a create SSL tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSL-tunneling-traffic and continue to monitor the session traffic for firewall policy/rule compliance (e.g., for the life of the session, for a predetermined period of time, and/or until a predetermined event occurs), and/or the firewall 314 can perform other responsive actions or combinations of various responsive actions. In some cases, if the traffic is determined to be authorized SSL remote-access traffic, the firewall 314 encrypts the tunneled traffic using a session key S2 and forwards the encrypted traffic to the remote server 316. Similarly, traffic coming from the server is decrypted with the session key S2, inspected by the firewall 314, and then encrypted using the session key S1 and forwarded to the client 312.

Thus, using these techniques, the firewall 314 is between the client 312 and the server 316 and can present itself as the server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skilled in the art in view of the various techniques and embodiments described herein, while the embodiments described above are described with reference to the SSL protocol, the various techniques described herein for providing identity protection can similarly be applied to other encrypted protocols that support tunneling.

Figure 4:
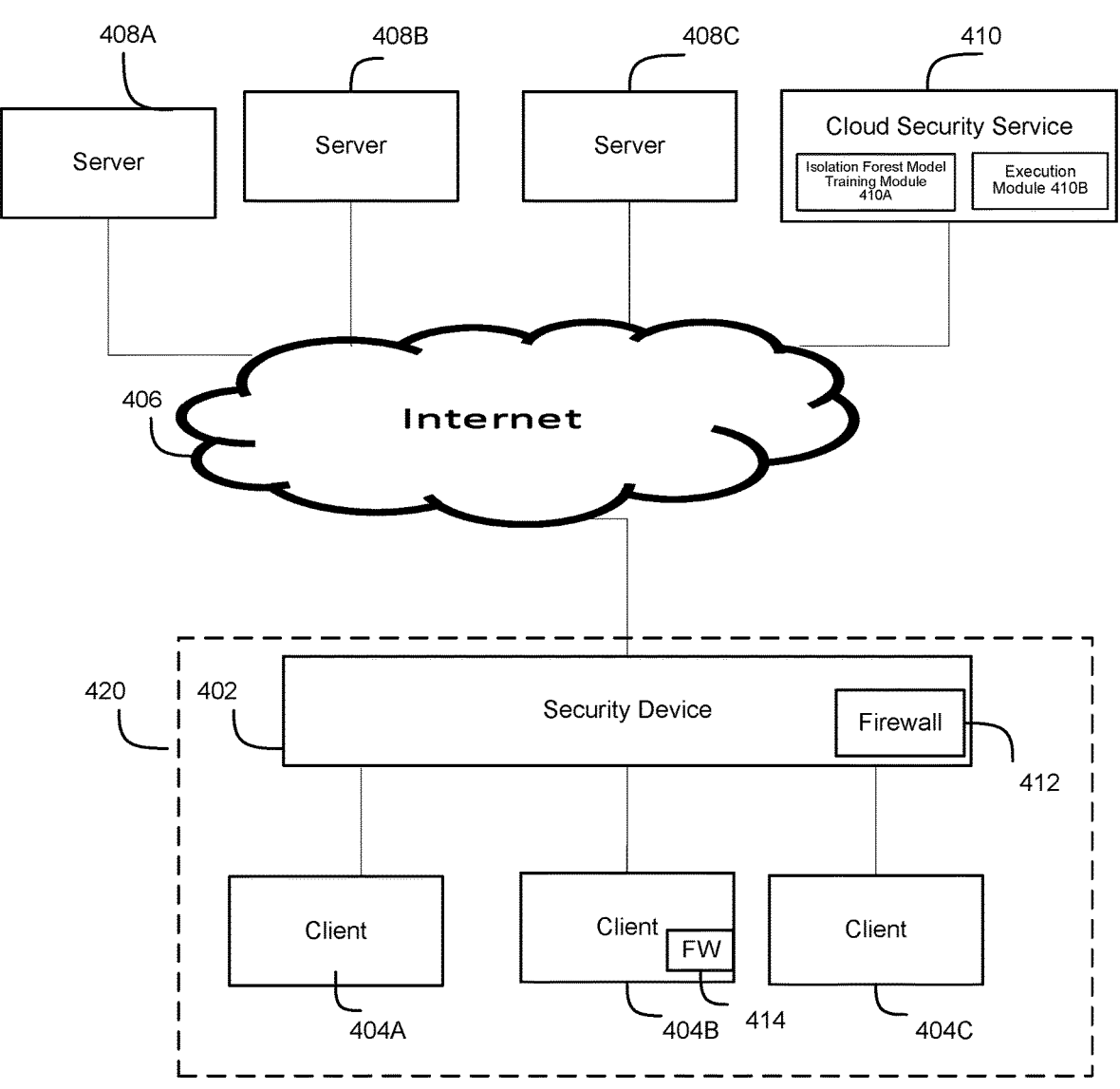
FIG. 4 is a block diagram illustrating another network architecture for detecting anomalous network behavior in operational technology protocols in accordance with some embodiments.

FIG. 4 is a block diagram illustrating another network architecture for detecting anomalous network behavior in operational technology protocols in accordance with some embodiments. As shown in FIG. 4, client devices 404A, 404B, and 404C are in communication with the Internet 406 via a security device 402. In some embodiments, the security device 402 includes a firewall 412 as shown, which can be used for security for enterprise network 420. In some embodiments, one or more of the client devices 404A-404C include a firewall 414 (e.g., host-based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIGS. 1 and 3B. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service), peer-to-peer related service (e.g., file sharing), IRC service (e.g., chat service), and/or any other service that can be delivered via the Internet.

As will now be apparent, some or all of the functions described above with respect to FIGS. 1 and 3B can be assisted by or implemented in whole or in part by the security cloud service 410. The security cloud service 410 can, for example, reduce the processing on the security device 402. As another example, detection of security policy violations and/or vulnerabilities based on password constraint enforcement used in external site authentication can be reported to the security cloud service 410 by the security device 402. The security cloud service 410 includes an isolation forest model training module 410A and an execution module 410B. The isolation forest model training module 410A can be configured to train a model implementing an isolation forest technique. The execution module 410B can be configured to execute the model.

One task performed by firewall 412 is URL filtering. Suppose enterprise network 420 belongs to a company, "ACME Corporation." Specified in security device 402 are a set of policies, some of which govern the types of websites that employees may access, and under what conditions. As one example, included in the firewall is a policy that permits employees to access news-related websites. Another policy included in the firewall prohibits, at all times, employees from accessing pornographic websites. Also included in the firewall is a database of URLs and associated categories. Other information can also be associated with the URLs in the database instead of or in addition to category information, and that other information can be used in conjunction with policy enforcement.

Figure 5:
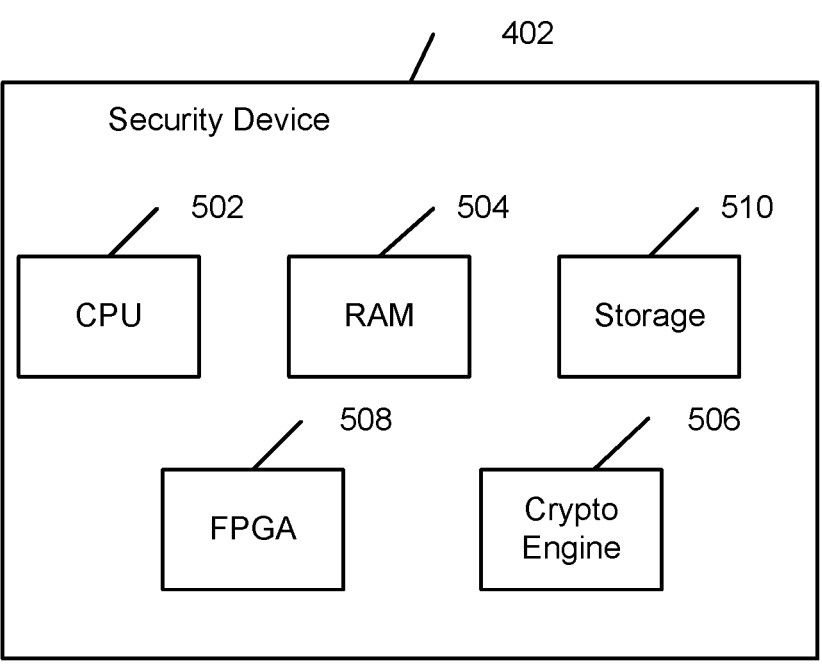
FIG. 5 is a functional diagram of hardware components of a security device for detecting anomalous network behavior in operational technology protocols in accordance with some embodiments.

FIG. 5 is a functional diagram of hardware components of a security device for detecting anomalous network behavior in operational technology protocols in accordance with some embodiments. The example shown is a representation of physical components that can be included in security device 402 (e.g., an appliance, gateway, or server). Specifically, security device 402 includes a high performance multi-core CPU 502 and RAM 504. Security device 402 also includes a storage 510 (e.g., one or more hard disks or solid state storage units), which is used to store policy and other configuration information as well as signatures. Security device 402 can also include one or more optional hardware accelerators. For example, security device 402 can include a cryptographic engine 506 configured to perform encryption and decryption operations, and one or more FPGAs 508 configured to perform signature matching, act as network processors, and/or perform other tasks.

Figure 6:
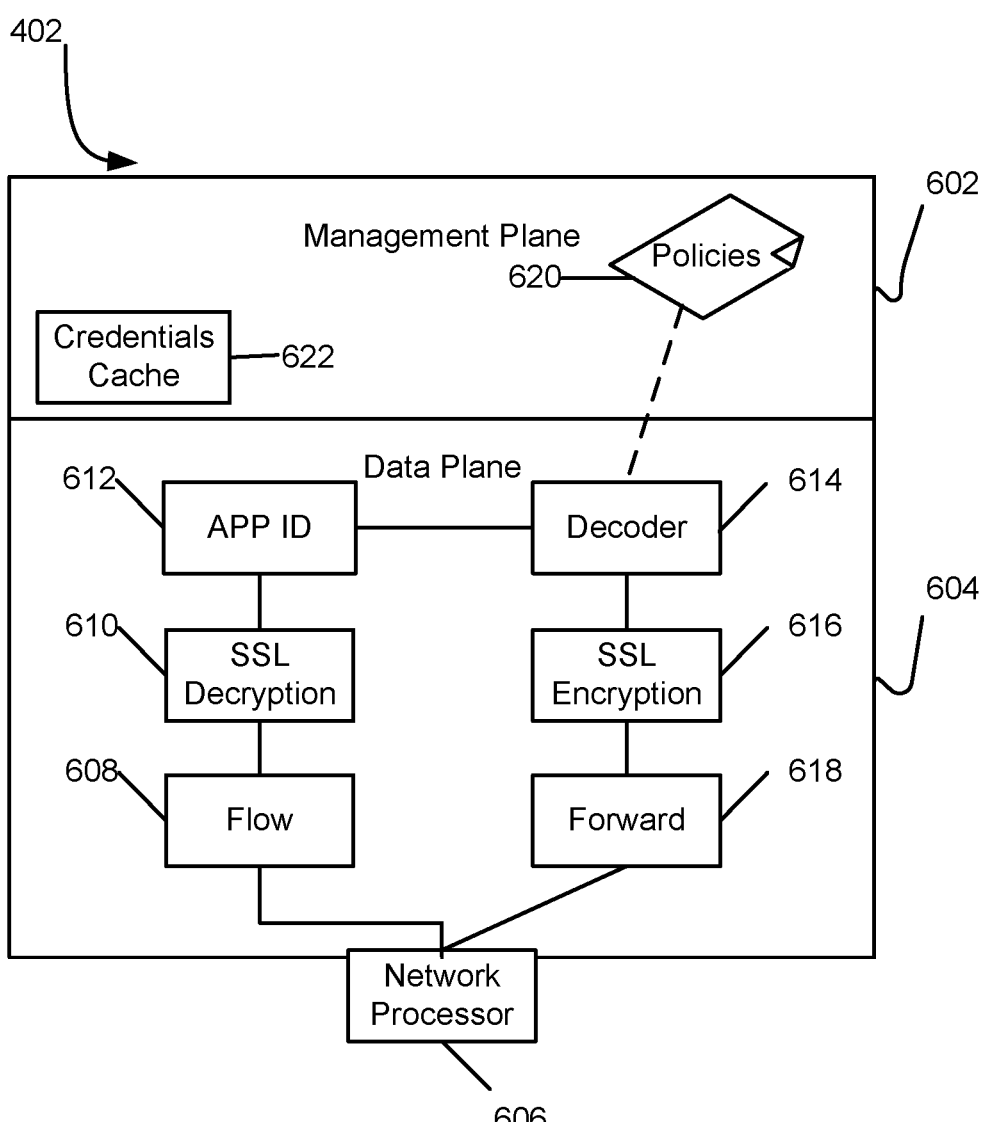
FIG. 6 is a functional diagram of logical components of a security device for detecting anomalous network behavior in operational technology protocols in accordance with some embodiments.

FIG. 6 is a functional diagram of logical components of a security device for detecting anomalous network behavior in operational technology protocols in accordance with some embodiments. The example shown is a representation of logical components that can be included in security device 402. As shown, security device 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information (e.g., to identify username/password credentials being submitted to an external site for user authentication). Decoder 614 also performs signature matching to determine what should happen to the packet. SSL encryption engine 616 performs SSL encryption using various techniques as described herein. Forwarding module 618 forwards the encrypted packet to its destination. As also shown, policies 620 are received and stored in the management plane 602. In some embodiments, policy enforcement using signatures is applied as described herein with respect to various embodiments based on the monitored, decrypted, identified, and decoded session traffic flows. In some embodiments, a credentials cache 622 is also provided for maintaining user credentials (e.g., a cache that can include usernames and passwords, such as a hash of the password data, can be stored, such as using an MD5 hash or another hash algorithm) associated with each external site for each user.

In some embodiments, referring to FIG. 2, clients 204, 206, and/or 208 correspond with operational technology (OT) devices, and servers 216, 218, and/or 220 correspond with OT devices. The clients 204, 206, and/or 208 can communicate with the servers 216, 218, and/or 220 using an OT protocol.

In some embodiments, referring to FIG. 4, clients 404A, 404B, and/or 404C correspond with OT devices, and servers 408A, 408B, and/or 408C correspond with OT devices. The clients 404A, 404B, and/or 404C can communicate with the servers 408A, 408B, and/or 408C using an OT protocol.

Operational technology corresponds to hardware and software that monitors and controls devices, processes, and infrastructure and is, typically, used in industrial settings. Examples of OT devices include programmable logic controllers (PLCs), supervisory control and data acquisition system (SCADA), etc.

The present application relates to industrial operational technology (OT) devices. The OT devices are typically used for mission critical applications across industries like manufacturing, healthcare, etc., and the OT devices do not use traditional networking protocols, such as TCP/IP, to communicate with each other. As an aspect, the OT devices can communicate with each other using an OT protocol. In some embodiments, since the OT devices are used for mission critical applications, these OT devices attract more attackers. In the event that a company's mission critical application is successfully attacked, there could be a significant loss for the company. Examples of OT malware/attacks include industrial malware, malicious scanning activity, distributed denial-of-service (DDoS) attacks targeting OT devices, etc.

In addition, since various types of OT devices come from different vendors and the various types of OT devices can be used for different use cases, providing an efficient malware detection solution for OT devices can be provided to achieve a high security coverage, especially when labeled training data is not available. Existing technologies provide minimal security for the OT protocols. For example, the existing technologies include a human expert verification technique and/or a rule matching technique. As an example, the human expert verification technique includes manually investigating OT device traffic to understand a candidate malware's behaviors, and decide whether the candidate malware is malicious. In some embodiments, the decision is made based on the investigator's personal experience. However, the human expert verification technique and/or the rule matching technique is not scalable for identifying OT protocol behavior, especially when there is one OT protocol in one product and another OT protocol in another product. Examples of OT protocols include PROFINET, PROFIBUS, EtherNet/IP, Modbus, etc. Another problem that limits scalability is that there is not a large amount of good neighbor data available for identifying OT attacks, especially if the OT attack is sophisticated. For example, it is difficult to label exactly which step or set of steps that occurred before an OT attack has occurred. Therefore, we are unable to train human experts to be able to detect these different types of OT attacks. So the present application introduces a new machine learning technique for detecting OT attacks.

In this case, different OT scenarios are analyzed with the desire to minimize human involvement in detecting malicious behavior. In this new proposal or framework, the present application specifically targets the OT protocol to cover static behaviors and dynamic behaviors of the OT protocol.

For example, static features of the OT protocol include the OT protocol app name, OT protocol vendor, OT protocol command, etc. In another example, for dynamic features of the OT protocol, network behaviors or a frequency of the network behaviors are analyzed to identify different types of dynamic features.

After the various static and dynamic features are obtained, the features can be input into a model implementing an unsupervised machine learning technique such as, for example, an isolation forest technique. The model implementing the unsupervised machine learning technique can be used for malware detection. In some embodiments, the model implementing the unsupervised machine learning technique can use labeled data to train the model and then the trained model is used for automatic malware detection.

In some embodiments, there are many different types of features, for example, there are categoric features, volume-based features, etc. and the data source is queried for all of the events of the OT protocol to obtain an event list, and a feature extraction operation is performed on the event list. After the features are extracted, the features (or signals) are converted into computable values, numerical values, or real values and then the values are fed into a detection framework or model. The detection framework or model processes all of these features together or a set of the features to output detection results.

The existing technologies are not scalable and only have a minimum number of specific OT protocols supported for this type of detection. For existing technologies, in the event that a new OT protocol is added, additional rules are needed or more human efforts under the existing technologies would be needed to detect malware for the new OT protocol.

As an aspect, in the present application, after a new malware is detected, a signature can be created automatically representing a set of events associated with the new malware and can automatically be added to the detection framework or model without human intervention. As a result, the detection framework or model can have a greater malware detection capability because human expert verification or rule matching is not involved. When a new protocol is included under the OT category, the detection framework or model can capture zero-day attacks because the detection framework or model can differentiate normal behaviors from abnormal behaviors.

The OT protocol includes a list of various protocols such as, for example, PROFINET, PROFIBUS, EtherNet/IP, Modbus, etc. An example of an OT device includes an Internet of Things (IoT) device that uses an OT protocol. Other examples of OT devices include a monitor that helps monitor industrial equipment, a device that helps monitor industrial equipment, and/or other devices that help control industrial equipment. In a few examples, an OT specific malware harvests information from OT devices, the OT specific malware compromises the OT device, and the OT specific malware is used for another purpose.

The present application analyzes the OT protocol and the behaviors of the OT devices. As an aspect, there are some similarities and some differences between the OT protocol and TCP protocol and/or UDP protocol. For similarities between the OT protocol and TCP/UDP protocols, both protocols can have similar features. For example, the features include a number of communications, a frequency (number of communications within a period of time) communicating with a remote device, an average time interval of communications, etc. Those features can be extracted among different protocols because the features relate to dynamic network behavior patterns or features. For differences, because the OT protocol is a new protocol, the OT protocol includes a new field or a new metadata inside not found in, for example, TCP or UDP. TCP and UDP protocols both include a header, and a header is not included in the OT protocol. The OT protocol also includes OT command, OT reject, and command value. The OT protocol also has an error code inside. All of these features of the OT protocol can be incorporated into the model.

These static network features can be extracted from the OT protocol, and for general network behavior patterns, dynamic features can also be extracted from the OT protocol. The number of communications, the volume of communications, and the frequency of communications with outside devices are examples of dynamic features to be extracted. Similar to TCP, the OT protocol includes a source and a destination, and then the source device and destination device can communicate with each other over the OT protocol. Furthermore, various OT protocols can also have different names. For example, one OT protocol is called the motor bus protocol and another OT protocol is called a shim protocol. An example of a shim protocol is Siemens S7 protocol. The motor bus protocol and the shim protocol are examples of OT protocols that are covered by this big umbrella of OT protocol.

One of the benefits of the model includes that different types of the OT protocol can be covered for protection from malware based on general network behaviors. Since this field is relatively new, there is not much labeled OT traffic, so the model can utilize the isolation forest technique. As more labeled OT traffic becomes available, other machine learning techniques can be utilized. Other machine learning techniques include a decision tree technique, a random forest technique, a deep learning technique, etc.

The isolation forest technique can help identify abnormal points which are different from the normal points. As an example relating to the OT protocol, the isolation forest technique can be introduced with specific features related to the OT protocol. A model implementing the isolation forest technique can be trained using a small amount of labeled data (e.g., one week of labeled data, two weeks of labeled data, etc.). After the model is trained, if, for example, a new device is introduced and connected to the OT network after as little as a few minutes, one hour, etc., features can be aggregated into a vector, and this vector can be fed into the model, and the model can output a prediction. In some embodiments, in order to generate the vector from the various features, different types of features are converted into scalar values, and optionally, the scalar values are normalized to obtain values between zero and one. The scalar values can be ordered based on various specific categories to obtain a feature vector. The final feature vector is a concatenation of all of the feature vectors. A threshold is also needed to be identified. For example, an output of the model of compared to the threshold, and in the event that the output is equal to or greater than the threshold, then the output can be an indication that the OT devices are not performing normal behavior (or abnormally) and in the event that the output is below the threshold, then the output can be an indication that OT devices are performing normally.

After a set of different types of features are fed into the model, the model can output the potential attack behavior. As an example, the output of the model corresponds to a probability that the behavior is an anomaly. In some embodiments, after feature information from the event list for the OT protocol has been extracted, the extracted feature information is normalized, and the normalized feature information is input into a model. In some embodiments, the model implements a machine learning technique such as, for example, an isolation forest technique and outputs a number between zero and one. The isolation forest technique can automatically compute a probability that the behavior is anomalous based on features fed into the model. In some embodiments, the output is compared to a threshold (e.g., 0.5, 0.75, 0.90, 0.97, 0.99, 0.999, etc.). In some embodiments, based on the amount of false positives, the threshold can be lowered to allow for more false positives in the event that the number of false positives is too low and possibly missing too much abnormal behavior, and the threshold can be increased to allow for fewer false positives in the event that the number of false positives is too high and possibly flagging too much normal behavior as abnormal.

FIG. 7 illustrates an example of an event log. The event log 700 includes OT protocol events such as, appname, command, localProfile, remoteDevID, remoteProfile, command_value, etc. In the event log, the OT protocol events are events of Modbus, which is a specific OT protocol.

As an example, categories of OT protocol events include app name list and app command list. Examples of OT protocol events in the app name list include modbus, siemens-s7, and bacnet. Examples of OT protocol events in the app command list include bacnet-base, bacnet-complex-ack, bacnet-i-am, bacnet-read-prop-multiple, bacnet-read-property, bacnet-simple-ack, modbus-base, modbus-read-coils, modbus-read-discrete-inputs, modbus-read-holding-registers, modbus-read-input-registers, modbus-write-multiple-registers, modbus-write-single-register, siemens-s7-base, siemens-s7-check-password-set, siemens-s7-comm-plus-base, etc.

Initially, raw network traffic data is obtained from a firewall or a network security device. In some embodiments, data related to the OT protocol is extracted from the raw network traffic data so that only OT protocol related network data remains. In some embodiments, non-OT network traffic data is filtered from the raw network traffic data, for example, TCP data and/or UDP data, so that only OT protocol related network data remains. Examples of OT protocol data include app name and app command, which relate to an operational level protocol. For other types of OT protocols, the OT protocol data can use a different name for an analogous event. In some embodiments, fields of the OT protocol include remote profile ID, commander value, etc. The remote profile ID relates to a type of remote profile that the OT device is talking to.

In some embodiments, the raw network traffic data includes a list of sessions and non-OT protocol events (e.g., UDP and/or TCP event data) are filtered out of the list of sessions to obtain events related to OT operations. Examples of the events include app name, command, local profile, remote profile, etc. Subsequently, features are extracted from the list of sessions based on the different profiles. In some embodiments, the same set of features are used for different profiles. In some embodiments, multiple events are collected for multiple sessions based on a time interval. In some embodiments, a feature vector is generated based on the multiple events. For example, if you have a command, you can extract categoric command features. Examples of categoric command features for the modbus protocol linclude modbus-base, modbus-read-coils, modbus-read-discrete-inputs, modbus-read-holding-registers, modbus-read-input-registers, modbus-write-multiple-registers, etc. These categoric command features can be extracted from sessions over a time interval and converted into feature vectors. For a local profile, the model can be trained. For a remote profile, you can also use the remote profile as a feature. As an example, features for device A are collected, and device A communicates with a device B via the network. In this case, device B is regarded as the remote device, and the profile of device B corresponds with the remote profile, and the profile of device A corresponds with the local profile. The aggregation can be performed on the list of sessions where various events are counted, and the number of times (count) that a specific event has occurred within a predetermined period of time (e.g., an interval of time) can relate to a feature.

For example, a feature relates to a number of events that occurred within an interval of time (e.g., one minute, two minutes, five minutes, one hour, etc.). In another example, a feature can relate to a number of connections that were made to an OT device or profile within an interval. In yet another example, a feature can relate to a number of different remote OT devices that connected with the OT profile or the OT device within the interval. The OT device can be a physical device having a MAC address. The OT profile can relate to a type of device. For example, an OT device is a device having an OT profile (e.g., Siemens Building Technology Device). Multiple OT devices can have the same OT profile if they are from the same manufacturer. As an aspect, each of the same OT device will have different OT device IDs.

After an interval of time (e.g., one minute, two minutes, five minutes, one hour, etc.), OT protocol data can be obtained, and features can be extracted from the obtained OT protocol data. Subsequently, the extracted features are converted into a feature vector. In some embodiments, the converting of the extracted features into the feature vector includes normalization of the converted extracted feature data. As an example, every five minutes of feature data is converted into a feature vector, and for one or two days, the feature vectors are inputted into a model.

As an abbreviated example of a feature vector, the feature vector corresponds to [0.2, 0.5, 0, 1, 0, 0] where [0.2] relates to a scalar feature, [0.5] relates to another scalar feature, and [1, 0, 0] relate to categorical features.

FIG. 8 illustrates an example of an isolation forest. As shown in FIG. 8, an isolation forest 800 illustrates outliers, which are easier to isolate, and inliers, which are harder to isolate.

In some embodiments, the model uses an isolation forest technique. In some embodiments, other unsupervised models such as DB Scan, Local Outlier Factor (LOF), etc. can be used to obtain outliers. After the vectors are input into the model, it is assumed that the majority of the input relates to normal vectors. After the vectors are input into the model, the similar vectors are aggregated together and non-normal vectors are aggregated as outliers in the forest where the leaf is relatively shorter than leaves of the aggregation of normal vectors. For example, for "normal" OT devices, the "normal" OT devices only talk to other OT devices, for example, 5-10 times per time interval, but in the event that an OT device talks with another OT device one or two thousand times in an interval, then that data will appear very different from data in the normal data range. As an example, if the number of times that an OT device talks with another OT device within an interval is more than one thousand, then the leaf is generated in one branch and if the number of times that an OT device talks with another OT device within an interval is less than one thousand, then the leaf is generated in another branch. As an example, only one leaf is generated where the interval is more than one thousand, and for all of the other leaves, the interval is less than one thousand. In this scenario, it can be easy to identify outliers where an outlier's branch is much smaller in length than other large branches.

In some embodiments, an array or a vector of values is generated where each value of the array for a row (or column) represents a different feature such as a number of connections for an interval, command, appname, etc. Because a string feature cannot be directly inputted into the model, the string feature can be converted into an integer. In some embodiments, the feature vector is a list of integers or real numbers. The model can automatically determine which interval looks suspicious because the model splits data into various branches (left branch or right branch). Since an isolation forest technique is used for the model, neighbor data is not needed.

As an example, for 10,000 samples (or intervals), each sample (or interval) is a node on the isolation forest output. As shown in FIG. 8, only one or two nodes are output as a branch off of the tree as an Outlier, and the rest of the nodes' output are part of the main branch as an Inlier. As an example, the branched off nodes of the outlier branch are easy to see because the outlier branch is shorter in length than the main branch.

After the isolated branch is identified, for each example tree, a score is output. The isolation forest technique is an ensemble technique that uses an average of predictions output by multiple decision trees for determining a final anomaly score. The final anomaly score can be normalized into a value between zero to one. The normalized score can be compared to a threshold. If the normalized score is equal to or exceeds the threshold, the sample is determined to be abnormal. If the normalized score is less than the threshold, the sample is determined to be normal. After the sample is determined to be abnormal, one or more of the following can be performed: notify an administrator, block the source of the sample (e.g., add the OT device (source) to a black list), the sample can be analyzed to determine whether it is malware (e.g., add the OT device (source) to a whitelist if the OT device (source) is not determined to have malware), etc. In some embodiments, the results are used to tune or update the threshold to optimize the number/frequency of false positives identified.

As an example, the command is a feature, and there can be two or three different types of command features. Also, a dictionary can be used to include all the possible commands of the OT protocol, and the feature can be represented by an integer. In another example, a feature can relate to a total number (a maximum volume) of connections to different remote device IDs over a period of time. Other examples of features include: appname, command, number of local profiles, number of distinct remote device IDs, number of distinct ports, a number of the total communications (volume or behavior) sent out during a period of time (or a time interval), etc.

After the features are identified, the features can be entered into a model. In some embodiments, the model implements a machine learning technique. In some embodiments, the machine learning technique corresponds to an isolation forest technique. After the model is executed, the model can output one or more outliers corresponding to abnormal behaviors. The model can be tuned. For example, a threshold for determining outliers can be adjusted to obtain a desired percentage of false positives.

Some of the benefits of the present application include being more scalable and having a higher detection rate than conventional techniques for detecting anomalous network behavior for OT protocol. Also, the model can be executed automatically without human supervision, so the data used does not need to be labeled (for example, labels include this is malware, this is not malware, or this may be potential malware). In other words, the data is analyzed and abnormal behaviors can be identified where abnormal behavior relates to a type of behavior that is outside the normal range. Also, the model of the present application can capture zero-day malware without involving a human expert or security expert.

Figure 9:
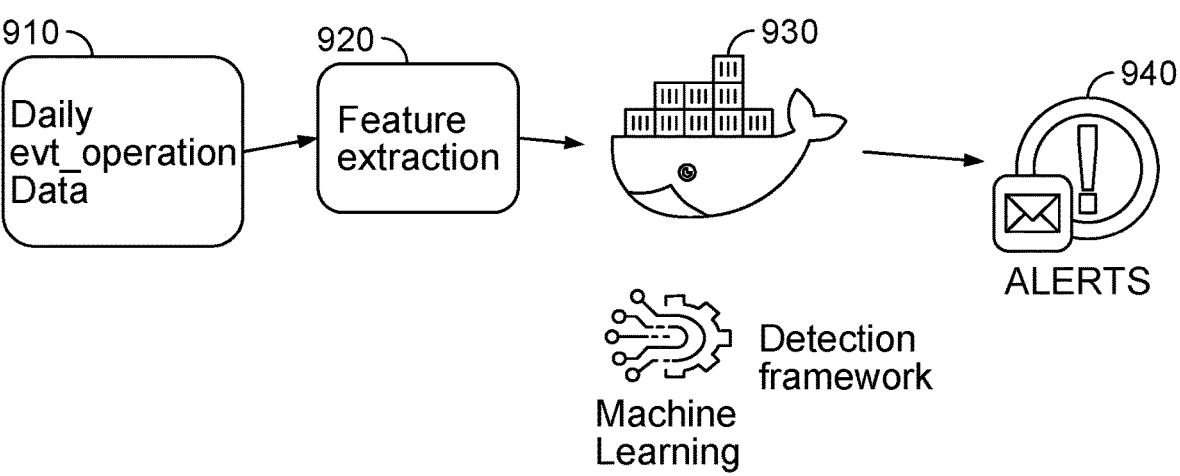
FIG. 9 is a functional diagram illustrating a model for detecting anomalous network behavior in operational technology protocols in accordance with some embodiments.

FIG. 9 is a functional diagram illustrating a model for detecting anomalous network behavior in operational technology protocols in accordance with some embodiments. In some embodiments, the model 900 is implemented by a data appliance, a gateway, or a firewall 202 of FIG. 2 and comprises: a daily evt_operation data module 910, a feature extraction module 920, a detection framework module 930, and an alert module 940.

In some embodiments, the daily evt_operation data module 910 receives network traffic to perform automated operational technology (OT) malware detection analysis of OT related network traffic. In some embodiments, the network traffic includes TCP network traffic, UDP network traffic, and OT related network traffic. In some embodiments, the daily evt_operation data module 910 filters the network traffic to remove the TCP network traffic and/or UDP network traffic, so that only OT related network traffic remains in the network traffic. In some embodiments, the daily evt_operation data module 910 extracts OT related network traffic from the network traffic.

In some embodiments, the feature extraction module 920 extracts features from the OT related network traffic. In some embodiments, the extracted features include a plurality of time intervals of network traffic data.

In some embodiments, the detection framework module 930 inputs the extracted features into a model to obtain an output. In some embodiments, a plurality of the time intervals of network traffic data corresponds with a plurality of nodes inputted into the model. In some embodiments, the model uses an isolation forest technique where outlier nodes are output.

In some embodiments, the alert module 940 performs an action based on the output of the model. In some embodiments, the output of the model relates to the outlier nodes. In some embodiments, the outlier nodes include one or more OT related network events. In some embodiments, the action includes blocking network traffic associated with a detected malware. In some embodiments, the action includes sending an alert to an administrator to inform them that a malware has been detected. In some embodiments, the action includes generating a new signature related to the one or more OT related network events.

Figure 10:
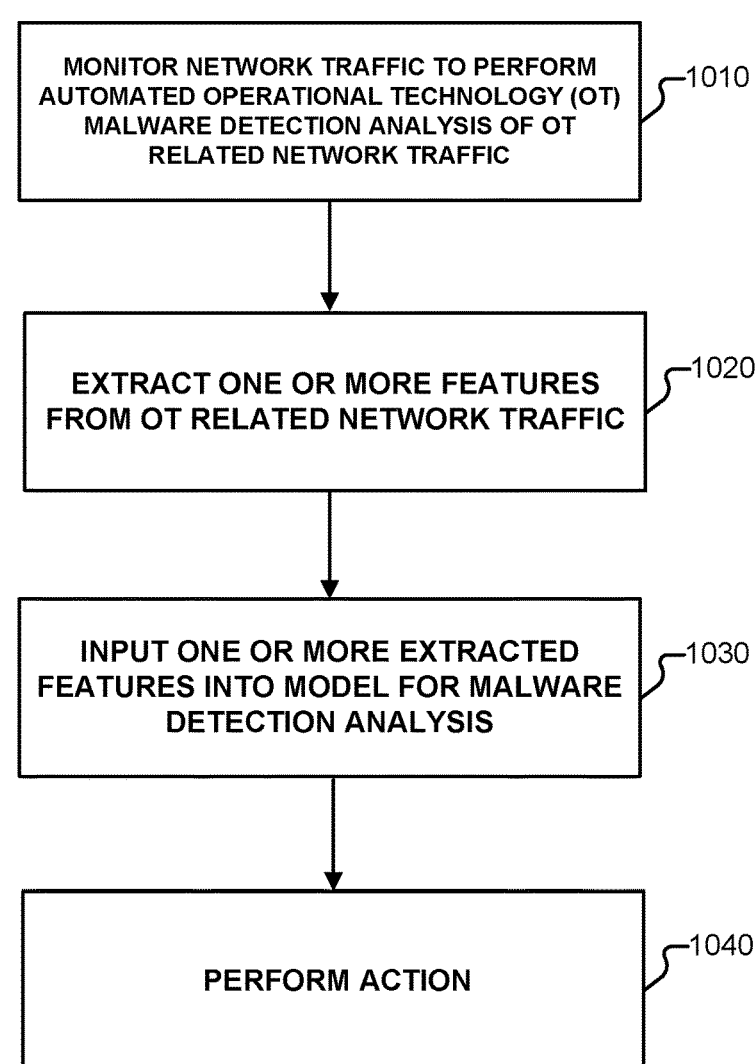
FIG. 10 is a flow diagram illustrating a process for detecting anomalous network behavior in operational technology protocols in accordance with some embodiments.

FIG. 10 is a flow diagram illustrating a process for detecting anomalous network behavior in operational technology protocols in accordance with some embodiments. In some embodiments, the process 1000 is implemented by a data appliance, gateway, or firewall 202 of FIG. 2 and comprises:

In 1010, the firewall monitors network traffic to perform automated operational technology (OT) malware detection analysis of OT related network traffic. In some embodiments, the traffic includes OT network traffic, TCP network traffic, and/or UDP network traffic.

In 1020, the firewall extracts one or more features from the OT related network traffic. In some embodiments, the one or more features include appname, command, a number of local profiles, a number of distinct remote device IDs, a number of distinct ports, a number of the total communications (volume or behavior) sent out during a period of time (or a time interval), etc.

In 1030, the firewall inputs the one or more extracted features into a model for malware detection analysis. In some embodiments, the one or more extracted features relate to a plurality of time intervals, and features associated with a time interval correspond with a node. In some embodiments, a plurality of nodes of data are input into the model via a plurality of vectors. In some embodiments, the model is a machine learning model. In some embodiments, the machine learning model implements an isolation forest technique. In some embodiments, the model outputs outlier nodes.

In 1040, the firewall performs an action based on a result of the model. In some embodiments, the action includes blocking network traffic associated with a detected malware. In some embodiments, the action includes sending an alert to an administrator to inform them that a malware has been detected. In some embodiments, the action includes generating a new signature relating to one or more OT related network events relating to a detected malware.

FIG. 11 is a flow diagram illustrating a process for training a model in accordance with some embodiments. In some embodiments, the process 1100 is implemented by a data appliance, gateway, or firewall 202 of FIG. 2 and comprises:

In 1110, the firewall trains a model using labeled training data. In some embodiments, the labeled training data includes labeled data. For example, labels include this is malware, this is not malware, or this may be potential malware.

In 1120, the firewall calculates a value of the model. In some embodiments, the firewall calculates a sum of a weighted vector of the labeled training data. In some embodiments, each feature of the vector is weighted, and each of the weighted features is summed to obtain the value.

In 1130, the firewall compares the value with a threshold.

In 1140, in the event that the value is greater than or equal to the threshold, the firewall adjusts the threshold. In some embodiments, the threshold is adjusted to have the number of false positives fall within an acceptable range, e.g., 1%, 2%, 3%, etc. In some embodiments, the firewall analyzes a set of results and adjusts the threshold to have the number of false positives fall within an acceptable range, e.g., 1%, 2%, 3%, etc.

In 1150, in the event that the value is less than the threshold, the firewall ends the process.

What is claimed is:

1. A system, comprising:
a processor of a firewall configured to:
    monitor network traffic to perform automated operational technology (OT) malware detection analysis of OT related network traffic;
    extract one or more features from the OT related network traffic to obtain an aggregated feature vector, comprising to:
        convert the extracted one or more features into one or more scalar values;
        normalize the one or more scalar values into one or more specific categories to obtain one or more feature vectors; and
        concatenate the one or more features vectors to form the aggregated feature vector;
    input the aggregated feature vector into a model for malware detection analysis, wherein the model includes a machine learning model, wherein the machine learning model is implemented using an isolation forest for anomaly detection, wherein the firewall is configured to train the model using labeled training data, compare a value of the model with a threshold value, determine that the value is greater than or equal to the threshold value, and in response to a determination that the value is equal to or greater than the threshold value, adjust the threshold value, and wherein the inputting of the one or more extracted features comprises to:
        receive an output from the model;
        compare the output with an output threshold; and
        in response to a determination that the output is equal to or exceeds the output threshold, determine that a sample associated with the network traffic is malware; and
    perform an action based on a result of the model, wherein the performing of the action comprises to:
    perform one or more of the following:
        block the network traffic; and/or
        generate a new signature relating to one or more OT related network events relating to a detected malware sample; and a memory coupled to the processor and configured to provide the processor with instructions.

2. The system of claim 1, wherein the monitoring of the network traffic comprises to:
    filter TCP related traffic and/or UDP related traffic from the network traffic to obtain the OT related network traffic.

3. The system of claim 1, wherein the performing of the action further comprises to:
    send an alert to an administrator.

4. The system of claim 1, wherein the one or more extracted features comprise one or more of the following: static behaviors, static protocols, dynamic behaviors, and/or dynamic protocols.

5. The system of claim 1, wherein the model is updated using labeled training data.

6. A method, comprising:
    monitoring, using a firewall, network traffic to perform automated operational technology (OT) malware detection analysis of OT related network traffic;
    extracting, using the firewall, one or more features from the OT related network traffic to obtain an aggregated feature vector, comprising:
        converting the extracted one or more features into one or more scalar values;
        normalizing the one or more scalar values into one or more specific categories to obtain one or more feature vectors; and
        concatenating the one or more features vectors to form the aggregated feature vector;
    inputting, using the firewall, the aggregated feature vector into a model for malware detection analysis, wherein the model includes a machine learning model, wherein the machine learning model is implemented using an isolation forest for anomaly detection, wherein the firewall is configured to train the model using labeled training data, compare a value of the model with a threshold value, determine that the value is greater than or equal to the threshold value, and in response to a determination that the value is equal to or greater than the threshold value, adjust the threshold value, and wherein the inputting of the one or more extracted features comprises:
        receiving an output from the model;
        comparing the output with an output threshold; and
        in response to a determination that the output is equal to or exceeds the output threshold, determining that a sample associated with the network traffic is malware; and
    performing an action based on a result of the model, wherein the performing of the action comprises:
        performing one or more of the following:
            blocking the network traffic; and/or
            generating a new signature relating to one or more OT related network events relating to a detected malware sample.

7. The method of claim 6, wherein the monitoring of the network traffic comprises:
    filtering TCP related traffic and/or UDP related traffic from the network traffic to obtain the OT related network traffic.

8. The method of claim 6, wherein the performing of the action further comprises:
    sending an alert to an administrator.

9. The method of claim 6, wherein the one or more extracted features comprise one or more of the following: static behaviors, static protocols, dynamic behaviors, and/or dynamic protocols.

10. The method of claim 6, wherein the model is updated using labeled training data.

11. A computer program product embodied in a non-transitory computer readable medium and comprising computer instructions for:

monitoring, using a firewall, network traffic to perform automated operational technology (OT) malware detection analysis of OT related network traffic;

extracting, using the firewall, one or more features from the OT related network traffic to obtain an aggregated feature vector, comprising:

converting the extracted one or more features into one or more scalar values;

normalizing the one or more scalar values into one or more specific categories to obtain one or more feature vectors; and concatenating the one or more features vectors to form the aggregated feature vector;

inputting, using the firewall, the aggregated feature vector into a model for malware detection analysis, wherein the model includes a machine learning model, wherein the machine learning model is implemented using an isolation forest for anomaly detection, wherein the firewall is configured to train the model using labeled training data, compare a value of the model with a threshold value, determine that the value is greater than or equal to the threshold value, and in response to a determination that the value is equal to or greater than the threshold value, adjust the threshold value, and wherein the inputting of the one or more extracted features comprises:

receiving an output from the model;

comparing the output with an output threshold; and in response to a determination that the output is equal to or exceeds the output threshold, determining that a sample associated with the network traffic is malware; and performing an action based on a result of the model, wherein the performing of the action comprises:

performing one or more of the following:

blocking the network traffic; and/or generating a new signature relating to one or more OT related network events relating to a detected malware sample.

12. The computer program product of claim 11, wherein the monitoring of the network traffic comprises:

filtering TCP related traffic and/or UDP related traffic from the network traffic to obtain the OT related network traffic.

13. The computer program product of claim 11, wherein the performing of the action further comprises:

sending an alert to an administrator.

14. The computer program product of claim 11, wherein the one or more extracted features comprise one or more of the following: static behaviors, static protocols, dynamic behaviors, and/or dynamic protocols.

\* \* \* \* \*